United States Patent [19]

Crowley

[11] 4,090,007
[45] * May 16, 1978

[54] EMBOSSED PLASTIC SURFACE COVERING AND METHOD OF PREPARING SAME

[76] Inventor: Richard P. Crowley, Suite 24H, 65 East India Row, Boston, Mass. 02110

[*] Notice: The portion of the term of this patent subsequent to Dec. 24, 1991, has been disclaimed.

[21] Appl. No.: 527,265

[22] Filed: Nov. 26, 1974

Related U.S. Application Data

[63] Continuation-in-part of Ser. No. 228,396, Feb. 22, 1972, Pat. No. 3,857,915, which is a continuation of Ser. No. 28,052, Apr. 13, 1970, abandoned, which is a continuation-in-part of Ser. No. 566,810, Jul. 21, 1966, Pat. No. 3,519,527, which is a continuation-in-part of Ser. No. 541,100, Apr. 8, 1966, Pat. No. 3,453,171.

[51] Int. Cl.² .............................. B29H 7/20; B32B 3/00
[52] U.S. Cl. .................................... 428/159; 156/79; 156/277; 264/52; 264/54; 427/264; 427/302; 427/373; 427/375; 428/170
[58] Field of Search .................... 156/78, 79, 307, 308, 156/277; 264/45, 52, 54; 427/301, 302, 373, 256, 264, 375, 322; 428/159, 170

[56] References Cited

U.S. PATENT DOCUMENTS

| | | | |
|---|---|---|---|
| 3,365,353 | 1/1968 | Witman | 428/170 |
| 3,519,527 | 7/1970 | Crowley | 264/54 X |
| 3,804,933 | 4/1974 | Allan et al. | 264/52 |
| 3,819,438 | 6/1974 | Witman | 264/52 X |
| 3,857,915 | 12/1974 | Crowley | 427/256 |

FOREIGN PATENT DOCUMENTS 1,144,777  3/1969  United Kingdom .................. 264/54

*Primary Examiner*—William A. Powell
*Attorney, Agent, or Firm*—Richard P. Crowley

[57] ABSTRACT

A chemically embossed cellular vinyl chloride resin sheet material is prepared by treating the gelled surface of a vinyl chloride resin plastisol containing a blowing agent and a peroxide catalyst which induces polymerization of an acrylic monomer or resin with a liquid which contains an acrylic monomer or resin subject to polymerization, and subsequently heating the treated gelled vinyl chloride resin sheet material to polymerize the acrylic monomer or resin and to decompose the blowing agent, whereby full expansion of the sheet material is prevented by the polymerization in the treated areas, thereby producing a chemically embossed product.

14 Claims, No Drawings

EMBOSSED PLASTIC SURFACE COVERING AND METHOD OF PREPARING SAME

REFERENCE TO PRIOR APPLICATIONS

This application is a continuation-in-part of U.S. patent application Ser. No. 228,396, filed Feb. 22, 1972 (now U.S. Pat. No. 3,857,915, issued Dec. 31, 1974), which application is a continuation of application Ser. No. 28,052, filed Apr. 13, 1970 (now abandoned), which application is a continuation-in-part of U.S. application Ser. No. 566,810, filed July 21, 1966 (now U.S. Pat. No. 3,519,527, issued July 7, 1970), which application is a continuation-in-part of U.S. application Ser. No. 541,100, filed Apr. 8, 1966 (now U.S. Pat. No. 3,453,171, issued July 1, 1969).

BACKGROUND OF THE INVENTION

Methods of imparting an embossed appearance to a cellular sheet include both chemical and mechanical embossing methods. U.S. Pat. No. 3,365,353 describes an improved method of chemically embossing a vinyl chloride resin cellular sheet material. This method incorporates a monomer compatible with a plasticized vinyl chloride into plastisol which is formed into a gelled resin sheet. A liquid containing a catalyst that will effect polymerization of the monomer in the formed vinyl chloride resin sheet is then applied in a predetermined pattern to one surface of the sheet and the resulting sheet heated to fuse the plasticized resin, decompose the blowing agent and to polymerize the monomer only in those areas where the catalyst has been applied, thereby obtaining a chemically embossed sheet material.

This method has a number of serious disadvantages. One major disadvantage is the requirement that the monomer be present throughout the entire plasticized vinyl chloride resin sheet. Typically, in the preparation of floor tile, only a minor portion of the tile is desired to have an embossed surface, such as the grout lines in an artificial stone pattern; that is, a depressed area, for example, 5 to 30%. Consequently, a major portion of the monomer in the plasticized vinyl chloride sheet is not contacted by the polymerization catalyst and not used, but results in a higher cost for the entire product. Another disadvantage is that the monomer selected must be wholly compatible with all components throughout the vinyl chloride resin sheet, since it is present throughout the entire body of the sheet, which compatibility limits the number of monomeric materials to be employed.

A further disadvantage of the described method is that the monomer by being blended into the plasticized vinyl chloride resin sheet formulation prior to the application or polymerization catalyst is subject to premature polymerization, either through the heat of the blending, mixing or gelation process or by the presence of the materials in the formulation, such as, for example, the metal salt stabilizers or other additives which may catalyze or lower the polymerization temperature of the monomer used. In addition, the presence of unpolymerized monomers in those areas of the sheet which have not been contacted with the polymerization catalyst applied in the printing ink is subject to change in physical properties on storage and aging or in temperature variations due to its polymerization tendency so that the resulting cellular chemically embossed sheet material may thus become in time more inflexible.

Furthermore, the employment of the polymerization catalyst in a liquid carrier is not an entirely efficient method of promoting the polymerization, since such polymerization depends upon the penetration of the polymerization catalyst into the sheet and the relatively uniform concentration of the catalyst during such penetration. Also, it is known that the use of materials in combination with certain metal salt stabilizers may tend to alter the decomposition temperature of the chemical blowing agent employed in a plasticized vinyl chloride resin sheet. Accordingly, where the monomer contains free hydroxyl groups, the incorporation of the monomer into the vinyl resin formulation may lower the decomposition temperature of the blowing agent used. Consequently, the blowing agent will decompose at a lower temperature and the polymerization catalyst used may correspondingly have a lower effective temperature in order to polymerize the monomer prior to substantial decomposition of the blowing agent.

Accordingly, my invention is directed to an improved chemical method of imparting an embossed appearance to a cellular sheet and to the embossed sheet products produced, which method and product are an improvement over the disclosure of U.S. Pat. No. 3,365,353.

SUMMARY OF THE INVENTION

My invention concerns a method of preparing a chemically embossed cellular sheet material, which method comprises: providing a sheet of a gas-expandable thermoplastic resin which contains a blowing agent subject to decomposition or expansion on heating, and a catalyst, such as a peroxide or other free radical catalyst, which hardens or polymerizes a polymerizable material, such as an acrylic monomer or resin; applying to the surface of the sheet a liquid containing a polymerizable material adapted to be polymerized by the catalyst in the sheet; permitting the liquid to penetrate the sheet material to a desired depth; and, thereafter, heating the treated sheet material to a temperature sufficient to polymerize the polymerizable material and simultaneously or thereafter to decompose the blowing agent, thereby producing a chemically embossed sheet material. Those areas of the sheet material which have been treated with the liquid composition will inhibit the full expansion of the sheet material on decomposition of the blowing agent and consequently represent those depressed or embossed areas of the resulting sheet product.

My method avoids the difficulties associated with the prior art, although, if desired, the use of a monomer throughout the entire thermoplastic sheet may be continued, but is not economical or an essential requirement of my method. My method permits the modification in alteration of the thermoplastic sheet material only in those particular areas and to the depth desired where the chemical embossing is required. My method is particularly adapted to the production of laminate-type sheet materials wherein the gas-expandable thermoplastic resin layer is cast or laminated onto a woven or nonwoven fibrous or nonfibrous supporting scrim or base sheet and where a clear transparent wear-resistant thin resin top layer is applied prior to creating the chemically embossed product. Such product is particularly adapted for use as a floor tile product, while when placed on a woven, knitted or stretchable fabric base may be employed as a wall or upholstery covering or for use in garments, boots, shoes, handbags and the like.

My invention in particular concerns the preparation of a chemically embossed cellular plasticized vinyl chloride sheet material, which method comprises casting a vinyl chloride resin plastisol containing azodicarbonamide as a blowing agent, and from about 2 to 25% by weight of a polymerization catalyst of the free radical type, such as a peroxide, which on heating will effect polymerization of an acrylic monomer into a thin layer onto a supporting sheet material, heating the cast plastisol to a temperature insufficient to decompose the blowing agent or the peroxide catalyst, but sufficient to form a gelled layer; e.g., 120° to 140° C; printing onto the smooth gelled plastisol surface a liquid composition which contains from about 5 to 50% by weight of a monomer subject to additional polymerization, such as an acrylic monomer; permitting the printing ink composition to penetrate the gelled layer to the desired degree; and, thereafter, heating the resulting treated product to a temperature of 170° to 350° C to provide for fusion of the plasticized vinyl chloride resin, to decompose the blowing agent and to polymerize the monomer employed in the printing ink composition in those particular areas where the printing ink was applied, the polymerization temperature being less than that of the temperature at which the blowing agent substantially decomposes; for example, less than 200° C or less than 170° C, thereby providing a cellular plasticized vinyl chloride resin embossed product.

The thermoplastic resin suitable for use in my invention includes, but is not limited to, those gas-expandable organic thermoplastic resinous materials, such as those polymers and copolymers of vinyl resins like vinyl chloride resins to include polyvinyl chloride and copolymers of vinyl chloride with shortchain fatty acids of vinyl esters, such as vinyl acetate or vinyldiene chloride, vinylbutylerate and such materials, as well as olefinic resins, such as $C_2$-$C_4$ olefinic resins of polypropylene, polyethylene, ethylene-propylene copolymers and terpolymers and the like. The thermoplastic resins may be suitably plasticized, such as by the use of ester-type plasticizers like adipates, sebacates, phthalates, and may contain those other additives normally employed, such as metal salt stabilizers, fillers, pigments, dyes, solvents, secondary plasticizers, viscosity-control additives and the like. The selection of the blowing agent to be employed depends upon the melt viscosity index and other factors of the polymer, which blowing agents and their selection are well known.

Catalysts to be incorporated in the thermoplastic resin include those catalysts known as polymerization catalysts, polymerization initiators, reaction catalysts, curing agents, crosslinking materials, and such other material which, in combination with the polymerizable material used, effect an increase in molecular weight and melt viscosity, such as caused by polymerization or condensation of a monomer or a resinous or polymeric material. Such hardening of the material in the thermoplastic sheet treated area inhibits the full expansion of the thermoplastic resin in the treated area, and thereby provides for a chemically embossed sheet material.

Sufficient catalyst should be employed to provide for the desired reaction, with additional catalyst to be avoided due to cost and possible deleterious effect. The catalyst would vary in amount, depending on the polymerizable material employed, but typically amounts of from about 2 to 25% by weight; e.g., 3 to 6%, may be employed. All or only a part of the catalyst may be included in the thermoplastic sheet material where required, and only the polymerizable material placed on the treated areas. This technique is particularly to be employed with a catalyst which performs another useful function in the resin sheet, such as a stabilizer, plasticizer and the like.

The catalysts useful in my invention include those compounds which dissociate, for example, on heating to form free radicals, such as those compounds used to promote, initiate or enhance polymerization of a polymerizable monomer or resin to be applied to the thermoplastic resin surface. Such catalysts include, but are not limited to, azo and per compounds, such as organic and inorganic peroxides, such as benzoyl peroxides, lauroyl peroxides, dicumyl peroxides, tertiary butyl peroctoate, methyl ethyl ketone peroxides, and other known peroxides used for such purposes. Other catalysts include perbenzoates like t-butyl perbenzoate and tertiary butyl peracetate, percarbonates like isopropyl percarbonate and bis (4-t-butyl) cycle hexyl peroxy dicarbonate, and diphatic azo catalysts like azonitrile, such as $\alpha,\alpha$, azodiisobutyronitrile. Catalysts which induce polymerization in the range of 150° to 250° F are the preferred catalysts, and are easily and readily incorporated into the thermoplastic resin formulation during normal mixing and formulation operations.

My polmerizable materials comprise those materials which alone or in a liquid carrier, such as a solution, emulsion or dispersion, will penetrate the thermoplastic sheet material and react with the catalyst in the sheet to effect polymerization or similar reaction to provide thermoset properties in the treated area, thereby preventing full expansion of the area through the expansion of or decomposition of the blowing agent. Such polymerizable material should cause such a change below or at or simultaneously with the substantial expansion of the sheet material by the blowing agent; for example, with a vinyl chloride resin sheet material at a temperature of below about 200° C; for example, in the range of 140° to 190° C for polyvinyl chloride resins.

The polymerizable material may comprise any monomer, resin or other material which is polymerized in the presence of the catalyst used in the sheet. The preferred materials are liquid monomers which may be applied to the sheet surface alone or in a volatile organic solvent solution, and which will penetrate the sheet to the desired depth in the time for processing the material through the gell and fusion ovens in the case of polyvinyl chloride resin plastisols. Typical polymerizable materials which may be employed and practiced in my invention include, but are not limited to, monomers one, two or more olefinic unsaturated bonds therein, such as those liquid acrylic monomers like methacrylic and acrylic acid and acrylic esters and ethers derived therefrom by reaction, with glycols and triols and other hydroxyl compounds, such as ethylene glycol, propylene glycol and butanediols, hexanediols, trimethyl propane and the like. Typicaly acrylic monomers would include 1,3-butylene glycol dimethacrylate, allylacrylate, ethylene glycol dimethacrylate, acrylic acid, and alkyl acrylate and alkyl methacrylates, such as t-butyl acrylate, 2-ethylhexyl acrylate, n-butyl methacrylate, 2-hydroxypropyl methacrylate, etc. Other monomers include unsaturated dicarboxylic acids and ethers and esters thereof like diallyl fumarate or vinyl monomers like divinyl benzene, etc. containing double bonds, preferably at least olefinically unsaturated and capable of additional polymerization on the addition of a polymerization catalyst.

It is preferred to employ polymerizable materials which are compatible with the thermoplastic resin sheet material, but is not wholly necessary where the incompatible material can be present in sufficient quantities to provide the desired effect on the treated areas or where a change in color or nature of the treated areas caused by such incompatibility is desired. Polymerizable materials used in this manner often range in amounts from about 5 to 40% of the liquid carrier. In connection with this application, the term "polymerization" includes condensation, copolymerization, polymerization, curing and other such reactions.

Although my catalytic agents and polymerizable material may be employed in bulk, it is often preferred to employ them in a liquid carrier, either as a dispersion, slurry or solution, emulsion and the like in order to permit a more rapid penetration of the materials into the treated areas. Typical liquid systems often employed would include a dispersing agent, such as a liquid plasticizer like an ester plastisol like a phosphate, a phthalate, such as dioctylphthalate, etc., or in solvents like a volatile organic solvent, such as acetone, esters and ethers and alcohol, such as methylethyl ketone, dioxane, tetrahydrofurane, hydrocarbons and chlorohydrocarbons, and combinations thereof with various diluents.

Where the surface of the resin sheet material is to be printed, it is often desirable to accomplish both printing and treatment in the same step, and, accordingly, liquid systems should include for printing ink compositions a resin binder, pigments, solvents, plasticizers, diluents, dyes, and other additives, such as inhibitors. The type and nature of the liquid carrier employed should be selected in order to permit the desired penetration to the desired depth in the required production time. Often where time permits, deeper penetration and better embossing results may be obtained by aging the sheet prior to subsequent decomposition of the blowing agent and fusion of the resin.

The polymerizable material is typically applied to the surface of the expandable sheet material in a printing ink composition. The material may be applied by spraying, casting, printing or otherwise deposited on the surface in film form. Printing is preferably done by the use of a flat or rotary screen printing which provides for the application of higher amounts and assures better penetration than the thin film deposited with a rotogravure printer.

The thermoplastic resin contains a blowing amount of a chemical blowing agent; e.g., 0.5 to 10 parts per hundred parts of resin, such as, for example, azodicarbonamide, barium azodicarboxylate, oxybisbenzenesulfonyl hydrazide, 5-phenyl tetrazole, dinitrosopentamethylenetetramine, and various derivatives thereof.

In one embodiment, all of the catalyst is incorporated directly into the thermoplastic resin formulation in its preparation and prior to its formation by casting, calendering or the like into sheet form, such as, for example, incorporation of a peroxide catalyst into the vinyl chloride resin plastisol prior to coating the plastisol onto a supporting layer. The layer is then heated and gelled, and then the polymerizable material in a liquid carrier, such as a printing ink, applied to the gelled surface to penetrate the surface. On subsequent heating, the catalyst in the sheet polymerizes the material prior to full expansion of the sheet.

In another embodiment, the catalyst is applied prior to the application of the polymerizable material to the surface of the resin sheet, preferably in a liquid carrier, such as a solvent solution for the catalyst, and the catalyst permitted to penetrate the sheet to a desired depth; e.g., 40 to 80%. Typically, the depth of penetration should be the same or slightly greater than the penetration depth of the polymerizable material to be applied subsequently. The catalyst may be applied only in those areas where the polymerizable material is to be applied; however, this is often difficult to accomplish in a practical sense due to the need for careful registration of the catalyst and polymerizable design. A preferred practice is to apply the catalyst to the entire sheet surface and the polymerizable material only to the areas to be depressed in the final design.

The catalyst, such as a peroxide, may be applied in a solution which permits rapid penetration, such as in a compatible liquid plasticizer, with the plasticizer and resin in the sheet or in an organic solvent, such as mineral spirits, alcohols, esters, ketones and hydrocarbons and combinations thereof.

In practice, my invention avoids the difficulties associated with employing all of the expensive polymerizable material in the resin sheet, and permits the material to be employed only where it is to be used to form a depressed area. The heating of the sheet to effect polymerization also decomposes the catalyst so that no residual catalyst remains in the sheet to affect later sheet properties as in the situation with the polymerizable material. Further, my process is economically efficient in that the lower-cost material in small amounts; i.e., the peroxide, is employed across the entire surface, while the expensive material is applied only to the required surface and sufficient amounts used and applied to the surface to effect retardation of full sheet expansion.

The technique of applying the catalyst to the surface just prior to the application of the polymerizable material; e.g., in a printing ink, is advantageous in that it avoids premature decomposition of the catalyst which may take place in the preparation of the formulation, inadvertent exposure on storage to high temperatures, or prolong exposure time prior to use and effectively uses the catalyst only in the depth of the layer desired, which avoids difficulties where different formulation layers, colors or formulations are used.

EXAMPLES

EXAMPLE 1

For the purposes of illustration only, my technique will be described in connection with the chemical embossing of a plasticized vinyl chloride resin sheet material employing the following formulations in Table I:

TABLE I

| Base Coat Formulation | |
|---|---|
| Base Coat Ingredients | Parts by Weight |
| Copolymer vinyl chloride-vinyl acetate (12%) | 50 |
| Polyvinyl chloride resin | 50 |
| Dioctylphthalate | 30 |
| Epoxidized soybean oil | 5 |
| Titanium dioxide pigment | 5 |
| Cadmium-zinc long-chain fatty soap stabilizer | 4 |
| Azodicarbonamide blowing agent | 4 |
| Benzoyl peroxide | 10 |

| Liquid Carrier Formulation | |
|---|---|
| 1,3-butylene glycol dimethacrylate | 20 |
| Resin binder (acrylic resin) | 25 |

| Liquid Carrier Formulation | |
|---|---|
| Methylethyl ketone | 10 |
| Dioxane | 40 |
| Pigments and dyes | 15 |
| Hydroquinone inhibitor | 0.1 |

| Top Coat Formulation | |
|---|---|
| Polyvinyl chloride resin | 80 |
| Dioctylphthalate | 20 |
| Dibutylphthalate | 5 |
| Barium Cadmium Organic soap stabilizer | 3 |
| Mineral Spirits | 15 |

The base coat formulation is cast onto a supporting sheet material, such as a resin-reinforced asbestos sheet material, in a thin wet foam layer of about 10 to 50 mils; for example, 12 to 20 mils, and then heated to a temperature sufficient to gel the plastisol without decomposition of the blowing agent; for example, 100 to 120° C; e.g., 110° C for 3 to 15 minutes; for example, 5 minutes. The liquid carrier is then applied in a predetermined pattern to the top surface of the gelled vinyl chloride sheet and allowed to penetrate into the surface for approximately 1 to 10 minutes, while longer periods, ½ to 12 hours, are used for deeper chemical embossing. The treated sheet is then heated to a temperature of approximately 100° to 120° C for 1 to 10 minutes in order to dry the liquid carrier. A top coat formulation is then cast in a thin wet layer from about 1 to 10 mils onto the treated gel surface and then the sheet material is heated in a hot-air oven containing infrared heaters to a temperature of 170° to 200° C for 3 to 10 minutes. Such heating decomposes the blowing agent and expands the sheet material into a cellular sheet product and provides for the fusion of the thermoplastic vinyl chloride resin and simultaneously or before polymerizes the monomer in the treated areas, resulting in a sheet which is chemically embossed.

EXAMPLE 2

Example 1 is repeated employing methylethyl ketone peroxide in the base formulation, and trimethylolpropane trimethacrylate in the liquid carrier.

EXAMPLE 3

A catalyst solution of tertiary butyl peroctoate in dioctylphthalate and mineral spirits is prepared. The base formulation without any peroxide was cast into sheet form as in Example 1 and gelled. The catalyst solution was then applied in a thim film onto the gelled surface and the catalyst solution allowed to penetrate the sheet depth for 5 to 20 minutes. The liquid carrier formulation was then applied as in Example 1 and the treated sheet heated as in Example 1 to provide a cellular chemically embossed product.

Having thus described my invention and the manner of using the same, what is claimed is:

1. A method of preparing a cellular chemically embossed sheet material, which method comprises:
    (a) providing a gas-expandable thermoplastic resin sheet material containing an expanding amount of a blowing agent of from about 0.5 to 10 parts per hundred parts of resin and a polymerizable amount of from about 2 to 25% by weight of a free radical catalyst adapted on heating to dissociate into free radicals and to polymerize an acrylic polymerizable monomer, the sheet material essentially free of such acrylic polymerizable monomer;
    (b) treating the surface of the said sheet material with an acrylic polymerizable monomer in a liquid carrier in a predetermined pattern and permitting the liquid carrier and monomer to penetrate into the depth of the sheet material; and
    (c) heating the treated sheet material to provide the formation of free radicals with essentially no residual catalyst remaining in the sheet material, the polymerization of the monomer in the sheet material and the expansion of the thermoplastic resin sheet material, the polymerization of the monomer by the catalyst inhibiting full expansion in the treated pattern area, and effecting chemical embossing of the sheet material.

2. The method of claim 1 wherein the catalyst is a peroxide or an azonitrile compound.

3. The method of claim 1 wherein the thermoplastic resin is plasticized vinyl chloride resin and the blowing agent is azodicarbonamide.

4. The method of claim 1 wherein the acrylic monomer is an acrylic acid, methacrylic acid, glycol and triol esters of acrylic and methacrylic acid, or alkyl acrylate and alkyl methacrylate or combinations thereof.

5. The method of claim 1 wherein the free radical catalyst is incorporated into the thermoplastic resin prior to formation of the thermoplastic resin into a sheet.

6. The method of claim 1 wherein the catalyst comprises from about 3 to 6% by weight of the thermoplastic resin sheet.

7. The method of claim 1 wherein the catalyst is applied to the surface in a solution of a thermoplastic resin liquid plasticizer or a volatile organic solvent.

8. The chemically embossed product produced by the method of claim 1.

9. The method of claim 1 which includes providing the catalyst in the thermoplastic resin sheet by treating the surface of the sheet with a catalyst in a liquid carrier, and to penetrate the sheet material to a desired depth prior to treatment of said surface with the acrylic monomer.

10. The method of claim 9 which includes treating the surface of the resin sheet with the catalyst only in those areas where the polymerizable monomer or resin is to be applied, and subsequently applying the polymerizable monomer or resin in a predetermined pattern only over such catalyst treated areas.

11. The method of claim 9 which includes applying a peroxide catalyst in an organic solvent to the surface of the resin sheet just prior to the application of the polymerizable monomer or resin.

12. The method of claim 9 wherein the catalyst penetrates the resin sheet to a depth of from about 40 to 80%.

13. A method of chemically embossing a gas-expandable vinyl chloride resin sheet, which method comprises:
    (a) incorporating a cross-linking amount of from about 2 to 25% by weight of a peroxide catalyst for an acrylic monomer into a vinyl chloride resin plastisol containing a blowing agent, the peroxide selected to be active above the gelling temperature of the plastisol, the plastisol essentially free of the acrylic monomer;

(b) casting a thin layer of the plastisol onto a supporting sheet;

(c) heating the layer to gel the plastisol and without substantial decomposition of the blowing agent or activation of the catalyst;

(d) treating the surface of the gelled plastisol layer with a cross-linkable polymerizable acrylic monomer in a liquid printing ink composition in a predetermined pattern; and (e) heating the treated sheet material to a temperature to cross-link the acrylic monomer in the treated areas, with essentially no residual peroxide catalyst left in the sheet material, thereby inhibiting full expansion of the sheet, to decompose the blowing agent, thereby expanding the layer and to fuse the resin in the expanded layer, thereby providing a chemically embossed sheet material.

14. The chemically embossed product produced by the method of claim 13.

* * * * *